United States Patent [19]

Sagawa et al.

[11] 3,956,234

[45] May 11, 1976

[54] INHIBITING OZONE DETERIORATION OF RUBBERS

[75] Inventors: Seiji Sagawa, Kawachinagano; Hideo Yamato, Minoo; Shuichi Kanagawa, Osaka, all of Japan

[73] Assignee: Sumitomo Chemical Company, Limited, Osaka, Japan

[22] Filed: Jan. 28, 1974

[21] Appl. No.: 437,219

[30] Foreign Application Priority Data

Jan. 31, 1973  Japan................ 48-13099

[52] U.S. Cl............................ 260/45.9 R; 260/799; 260/810
[51] Int. Cl.²............................................ C08J 3/20
[58] Field of Search............ 260/45.9 R, 465.1, 799, 260/820

[56] References Cited

UNITED STATES PATENTS

| | | | |
|---|---|---|---|
| 2,429,452 | 10/1947 | Cass................................ | 260/465.1 |
| 2,748,155 | 5/1956 | Wordie............................. | 260/465.1 |
| 2,760,950 | 8/1956 | Stanton et al.................. | 260/45.9 R |
| 3,400,099 | 9/1968 | Cook................................ | 260/45.85 |
| 3,623,984 | 11/1971 | Carlos et al.................. | 260/45.9 NC |

*Primary Examiner*—V. P. Hoke
*Attorney, Agent, or Firm*—Wenderoth, Lind & Ponack

[57] ABSTRACT

Rubbers are prevented from ozone deterioration without discoloring or staining by the addition of a low toxic nitrile of the formula,

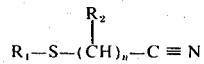

wherein $R_1$ is an alkyl or

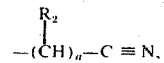

$R_2$ is a hydrogen atom or a methyl or ethyl group, and $n$ and $a$ are integers of 1 to 5, with the qualification that when $a$ is an integer of 2, then $R_2$ is methyl or ethyl.

2 Claims, No Drawings

INHIBITING OZONE DETERIORATION OF RUBBERS

The present invention relates to a new method for inhibiting ozone deterioration of rubbers without problems due to discoloring, staining or toxicity, which method is very effective for protecting natural or synthetic rubbers from the ozone deterioration, i.e., generation and growth of cracks.

Natural or synthetic rubber is generally deteriorated by the action of oxygen or ozone resulting in the remarkable deterioration of its physical properties. Particularly in recent years, the deterioration caused by trace amounts of ozone in atmosphere has become a serious problem.

There have been developed various kinds of method, for the purpose of the prevention of deterioration by ozone, and it has been found that some amine compounds belonging to p-phenylenediamine derivatives act effectively as an antiozonant. These amine compounds, however, have such a property that they are discolored as early as on a rubber compounding step and particularly on a vulcanization step, or they are increasingly discolored to larger extent by the subsequent action of heat or sunlight thereby causing the discoloration of rubber itself. Alternatively, the compounds have such a property that they stain the surface of materials which have been brought into contact with the rubber. For this reason, the amine compounds can substantially be used only for the rubber products incorporated with carbon black, irrespective of their excellent inhibiting property of ozone deterioration.

Furthermore, it is well known that the amine compounds generally have a high toxicity which causes a serious problem. This promoted the development of a non-discoloring, non-staining and low-toxic antiozonant which is also available for the white rubber products, as a result of which it was found that phenol type or thiourea type compounds have an excellent inhibiting effect of ozone deterioration. In recent years, however, an antiozonant having as the major component the formula,

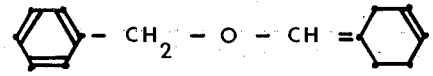

was found to be a non-discoloring and non-staining antiozonant that is much superior to the phenol type and thiourea type compounds above mentioned, and the product has become to be used in a large amount. This product surely has excellent non-discoloring and non-staining properties, however its inhibiting effect of ozone deterioration is not necessarily satisfactory compared with the amine compounds. The inventors have synthesized and tested a wide range of compounds for the purpose of developing a non-discoloring, non-staining and in addition low-toxic antiozonant, and found that nitriles of the formula (I),

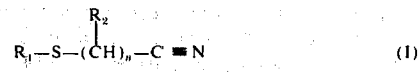

wherein $R_1$ is a $C_1 - C_{18}$ alkyl or

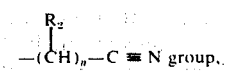

$R_2$ is a hydrogen atom or a methyl or ethyl group, and $n$ is an integer of 1 to 5, have a non-discoloring and a non-staining properties and effective protective ability for ozone deterioration of vulcanized rubber. Owing to the non-discoloring and non-staining properties, the nitriles can also be used for producing the white, pale or colored rubber products to which the conventional amine type antiozonants would be unpreferably applied. Furthermore, the nitriles can not only be prepared in an industrial scale economically and advantageously, but also their toxicity to human body is very low ($LD_{50} = 5,300 - 9,600$ mg/kg), and therefore they have an important significance in a practical application.

The most preferables among the nitriles of the formula (I) are ones having as $R_1$

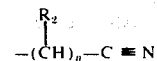

wherein $R_2$ and $n$ are as defined above. The favorables are ones having as $R_1$ a $C_1 - C_{18}$ alkyl group, preferably a $C_1 - C_4$ alkyl group.

As examples of the nitriles of the present invention, there are listed various compounds as follows, which are only given for the purpose of illustration and not to be interpreted as limiting.

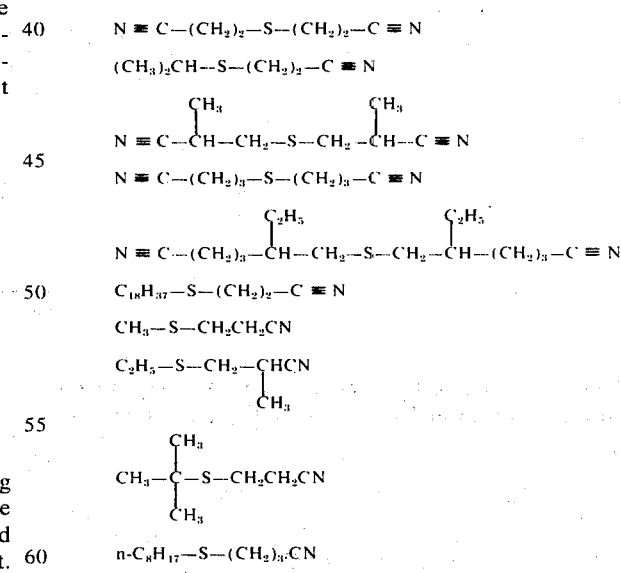

The nitriles of the present invention can easily be prepared according to the manner known per se, for example, by the reaction between corresponding alkylene nitriles, for example, acrylonitrile, and hydrogen sulfide or mercaptane derivatives, or by the reaction between corresponding end-halogenated aliphatic nitriles and mercaptane derivatives.

Rubbers which can be used in the present invention include natural rubber and synthetic rubbers such as styrene-butadiene rubber, chloroprene rubber, butadiene rubber, isobutylene-isoprene rubber, isoprene rubber, nitrile-butadiene rubber, ethylene-propylene terpolymer and all other rubbers.

Furthermore, the present compounds have such an outstanding characteristic that they can be applied in combination with the conventionally available vulcanizing agents, vulcanization accelerators, inhibiting agents for heat-aging or flex-cracking, antioxidants, filler pigments and other rubber-compounding agents, without giving any adverse effect on the vulcanization property and other physical properties of rubber.

The amounts of the present antiozonants used are generally 0.01 to 10 % by weight based on rubber, and preferably 0.1 to 5 %, and in addition the performance thereof can outstandingly be increased by the combination with petroleum waxes.

The present invention will be illustrated with reference to the following examples, which are only given for the purpose of illustration and not to be interpreted as limiting. Parts are by weight.

EXAMPLE 1

Two parts of each of the present compounds in Table 1 (sample numbers A to H) and, as a counterpart, Antiozonant AFD (a registered trademark of Bayer Co. Ltd.) represented by sample number I were individually mixed thoroughly with the following rubber compound,

| | | |
|---|---|---|
| pale crape No. 1 | 100 | parts |
| stearic acid | 2 | " |
| zinc oxide | 5 | " |
| white carbon (Caplex No. 80, a registered trademark of Shionogi Seiyaku Co. Ltd.) | 30 | " |
| light calcium carbonate | 40 | " |
| titanium dioxide | 10 | " |
| softener (Circosol 42XH, a registered trademark of Sun Oil Co. Ltd.) | 10 | " |
| activator (Acting SL, a registered trademark of Kawaguchi Kagaku Co. Ltd.) | 1 | " |
| sulfur | 0.5 | part |
| dibenzothiazyl disulfide | 0.8 | " |
| tetramethylthiuram monosulfide | 0.1 | " | and each resulting mixture was well milled on a 2-roll mill of 10 inches in diameter and then vulcanized thereon at 140°C. for 20 minutes. A blank test was also carried out at the same time for comparison, using the rubber compound alone above mentioned.

Then, Dumbbel No. 2 test pieces were prepared from each vulcanized batch thus obtained according to ASTM D-412-51T. The static and dynamic ozone deterioration tests were made on the test pieces on the Ozone Weather-O-Meter produced by Toyo Rika Co. Ltd. In the static test, the Dumbbel No. 2 test pieces were kept at a 20 % elongation in the stream of ozone during the test, and during the latter test, the test pieces were given repeated elongation of from 0 up to 20 % once a second in the stream of ozone.

The tests were carried out under the condition that the ozone concentration be $35 \pm 5$ pphm and the test temperature be $50 \pm 10°C.$, and the time required for the generation of visually observable cracks on the surface of the vulcanized rubber was taken as a crack-generating time which was used as the measure of ozone-resistance. The results of the static and dynamic ozone deterioration tests are as shown in Table 2 and Table 3, respectively.

Table 1

| Sample No. | Sample |
|---|---|
| A | $N \equiv C-(CH_2)_2-S-(CH_2)_2-C \equiv N$ |
| B | $(CH_3)_2CH-S-(CH_2)_2-C \equiv N$ |
| C | $N \equiv C-CH(CH_3)-CH_2-S-CH_2-CH(CH_3)-C \equiv N$ |
| D | $N \equiv C-(CH_2)_3-S-(CH_2)_3-C \equiv N$ |
| E | $N \equiv C-(CH_2)_3-CH(C_2H_5)-CH_2-S-CH_2-CH(C_2H_5)-(CH_2)_3-C \equiv N$ |
| F | $C_{18}H_{37}-S-(CH_2)_2-C \equiv N$ |
| G | a mixture of No. A and petroleum was (Suntight S[1]) in a weight ratio of 1:1 |
| H | a mixture of No. D and petroleum was (Suntight S[1]) in a weight ratio of 1:1 |
| I | Antiozonant AFD |

Note: [1] A registered trademark of Seiko Kagaku Co. Ltd.

Table 2

| | Static ozone deterioration test | | |
|---|---|---|---|
| Test No. | Sample No. | Amount added (part) | Crack-generating time (hour) |
| 1 | A | 2 | 20 |
| 2 | B | 2 | 15 |
| 3 | C | 2 | 18 |
| 4 | D | 2 | 19 |
| 5 | E | 2 | 16 |
| 6 | F | 2 | 14 |
| 7 | G | 2 | 25 |
| 8 | H | 2 | 25 |
| 9 | I | 2 | 10 |
| 10 | no addition | | 2 |

Table 3

| Test No. | Sample No. | Dynamic ozone deterioration test Amount added (part) | Crack-generating time (hour) |
|---|---|---|---|
| 11 | A | 2 | 24 |
| 12 | B | 2 | 16 |
| 13 | C | 2 | 20 |
| 14 | D | 2 | 22 |
| 15 | E | 2 | 16 |
| 16 | F | 2 | 15 |
| 17 | G | 2 | 24 |
| 18 | H | 2 | 23 |
| 19 | I | 2 | 12 |
| 20 | | no addition | 2 |

EXAMPLE 2

Two parts of each of the present compounds in Table 1 (sample numbers A to H) and, as a counterpart, Antiozonant AFD represented by sample number I were individually mixed thoroughly with the following rubber compound,

| | | |
|---|---|---|
| SBR No. 1502 | 100 | parts |
| stearic acid | 1 | " |
| zinc oxide | 5 | " |
| white carbon (Carplex No. 80) | 30 | " |
| light calcium carbonate | 20 | " |
| titanium dioxide | 10 | " |
| softener (Circosol 42XH) | 10 | " |
| activator (Acting SL) | 1 | " |
| sulfur | 2 | " |
| dibenzothiazyl disulfide | 1.5 | " |
| tetramethylthiuram monosulfide | 0.2 | " | and each resulting mixture was well milled on a 2-roll mill of 10 inches in diameter and then vulcanized thereon at 150°C. for 30 minutes. A blank test was also carried out at the same time for comparison, using the rubber compound alone above mentioned. The test pieces prepared from each vulcanized batch were tested under the same condition of ozone deterioration test as described in Example 1.

The results of the static and dynamic ozone deterioration tests are as shown in Table 4 and Table 5, respectively.

Table 4

| Test No. | Sample No. | Static ozone deterioration test Amount added (part) | Crack-generating time (hour) |
|---|---|---|---|
| 21 | A | 2 | 16 |
| 22 | B | 2 | 11 |
| 23 | C | 2 | 13 |
| 24 | D | 2 | 15 |
| 25 | E | 2 | 11 |
| 26 | F | 2 | 10 |
| 27 | G | 2 | 22 |
| 28 | H | 2 | 21 |
| 29 | I | 2 | 6 |
| 30 | | no addition | 1 |

Table 5

| Test No. | Sample No. | Dynamic ozone deterioration test Amount added (part) | Crack-generating time (hour) |
|---|---|---|---|
| 31 | A | 2 | 21 |
| 32 | B | 2 | 14 |
| 33 | C | 2 | 18 |
| 34 | D | 2 | 19 |
| 35 | E | 2 | 15 |
| 36 | F | 2 | 13 |
| 37 | G | 2 | 20 |
| 38 | H | 2 | 19 |
| 39 | I | 2 | 9 |

Table 5-continued

| Test No. | Sample No. | Dynamic ozone deterioration test Amount added (part) | Crack-generating time (hour) |
|---|---|---|---|
| 40 | | no addition | 2 |

EXAMPLE 3

Two parts of each of the present compounds in Table 1 (sample numbers A to H) and, as a counterpart, Antiozonant AFD represented by sample number I were individually mixed thoroughly with the following rubber compound,

| | | |
|---|---|---|
| chloroprene rubber WR T | 100 | parts |
| stearic acid | 0.5 | " |
| zinc oxide | 5 | " |
| magnesia | 4 | " |
| light calcium carbonate | 45 | " |
| titanium dioxide | 5 | " |
| 2-mercapto imidazoline | 0.5 | " | and each resulting mixture was well milled on a 2-roll mill of 10 inches in diameter, and then vulcanized thereon at 150°C. for 30 minutes. A blank test was also carried out at the same time for comparison, using the rubber compound alone above mentioned.

The test pieces prepared from each vulcanized batch were tested under the same condition of ozone-deterioration test as described in Example 1 except that the ozone concentration was 90 ± 5 pphm.

The results of the static and dynamic ozone deterioration tests are as shown in Table 6 and Table 7, respectively.

Table 6

| Test No. | Sample No. | Static ozone deterioration test Amount added (part) | Crack-generating time (hour) |
|---|---|---|---|
| 41 | A | 1.5 | 200 |
| 42 | B | 1.5 | 175 |
| 43 | C | 1.5 | 190 |
| 44 | D | 1.5 | 195 |
| 45 | E | 1.5 | 180 |
| 46 | F | 1.5 | 170 |
| 47 | G | 1.5 | 220 |
| 48 | H | 1.5 | 220 |
| 49 | I | 1.5 | 140 |
| 50 | | no addition | 20 |

Table 7

| Test No. | Sample No. | Dynamic ozone deterioration test Amount added (part) | Crack-generating time (hour) |
|---|---|---|---|
| 51 | A | 1.5 | 220 |
| 52 | B | 1.5 | 185 |
| 53 | C | 1.5 | 210 |
| 54 | D | 1.5 | 215 |
| 55 | E | 1.5 | 190 |
| 56 | F | 1.5 | 180 |
| 57 | G | 1.5 | 230 |
| 58 | H | 1.5 | 220 |
| 59 | I | 1.5 | 160 |
| 60 | | no additiont | 40 |

EXAMPLE 4

Vulcanized rubber was tested on its discoloring and staining properties by the following test method. A strip test piece was prepared from each white vulcanized batch obtained in Example 1. Each piece was placed on the paper coated with a nitrocellulose based white lacquer, and the whole was attached, with the test piece faced outward, to an exposure frame which faced toward south at 45° of inclination angle, and exposed to sun light for 15 days. The results of the exposure tests are as shown in Table 8.

Table 8

| Test No. | Sample No. | Amount added (part) | Shades of test piece after test | Shades of lacquer coated surface after test |
|---|---|---|---|---|
| 61 | A | 2 | pale yellow | very pale yellow |
| 62 | B | 2 | pale yellow | white |
| 63 | C | 2 | '' | very pale yellow |
| 64 | D | 2 | '' | '' |
| 65 | E | 2 | '' | '' |
| 66 | F | 2 | very pale yellow | white |
| 67 | G | 2 | '' | '' |
| 68 | H | 2 | '' | '' |
| 69 | I | 2 | pale yellow | very pale yellow |
| 70 | | no addition | '' | white |

It can clearly be understood from the test results that the present compounds are equivalent to superior to the well known antiozonant AFD which is said to have the most excellent non-discoloring and non-staining properties, and that they are also remarkably superior to Antiozonant AFD in the inhibiting effect of ozone deterioration.

What we claim is:

1. A method for inhibiting ozone deterioration of rubber which rubber is selected from the group consisting of natural rubber, styrene-butadiene rubber, chloroprene rubber, butadien rubber, isobutylene-isoprene rubber, isoprene rubber, nitrile-butadiene rubber and an ethylene-propylene terpolymer which comprises adding to the rubber, 0.01 to 10% based on the weight of the rubber, of a nitrile of the formula (I), $$R_1-S-(CH)_n-C\equiv N \quad\quad (I)$$
$$\overset{R_2}{|}$$

wherein $R_1$ is a $C_1 - C_{18}$ alkyl, or $$-(CH)_a-C\equiv N \text{ group,}$$
$$\overset{R_2}{|}$$

$R_2$ is a hydrogen atom, or a methyl or ethyl group, and $n$ and $a$ are integers of 1 to 5 with the qualification that when $a$ is an integer of 2, then $R_2$ is methyl or ethyl.

2. The method according to claim 1, wherein in said nitrile of the formula (I), $R_1$ is $$-(CH)_a-C\equiv N.$$
$$\overset{R_2}{|}$$

wherein $R_2$ and $a$ are as defined in claim 1.

* * * * *